Patented Aug. 21, 1934

1,970,710

UNITED STATES PATENT OFFICE 1,970,710

KETONIC PERYLENE DERIVATIVE AND PROCESS OF PREPARING SAME

Cecil Shaw and Robert Fraser Thomson, Grangemouth, Scotland, assignors to Imperial Chemical Industries Limited, a corporation of Great Britain No Drawing. Application April 11, 1932, Serial No. 604,655. In Great Britain April 16, 1931

12 Claims. (Cl. 260—61)

This invention relates to the manufacture, production and use of intermediates and dyestuffs of the anthraquinone series, and in particular consists in new or improved processes for the manufacture and use of intermediates and dyestuffs from hydroxy or substituted hydroxy ketonic perylenes.

It is already known that black and grey vat dyestuffs can be obtained by heating certain substituted derivatives of dibenzanthrone and isodibenzanthrone containing nitrogen in the presence of solvents or diluents.

According to the present invention a hydroxy or substituted hydroxy ketonic perylene is heated above about 270° C. with a carboxylic acid anhydride.

In particular we have found that Bz2,Bz2'-dihydroxy- or Bz2,Bz2'-dialkoxy-dibenzanthrones, when heated with a chlorinated phthalic anhydride at a temperature above about 300° C., give new products which have the properties of vat dyestuffs. A surprising feature is the fact that a product can be obtained from Bz2,Bz2'-dihydroxy-dibenzanthrone which is fast to acids and alkalis.

We find chlorinated phthalic anhydrides are very suitable solvents, and that a very convenient temperature range is 300–400° C. The chlorinated phthalic anhydrides have the advantages of being stable at high temperatures, of being good solvents at these temperatures, having low vapour pressure and consequently small fire risk, of being readily removed by extraction with water, and of being easily recoverable for re-use. Further, in the extraction process, if the dyestuff is sufficiently pure, it is generally also obtained in a very fine state of division, so that it is suitable for immediate use.

The mixture of dyestuff and anhydride may be heated in the presence of small quantities of metallic substances or salts and this has the effect in certain cases of producing differences in shade of the resulting products.

The following examples, in which the parts are by weight, illustrate but do not limit the invention.

Example 1

500 parts of phthalic anhydride are heated to 170° C. and at this temperature 100 parts of Bz2,Bz2'-dimethoxy-dibenzanthrone are gradually added. The temperature is then raised, with good stirring, until the mixture boils, and boiling is continued for about 12 hours. The mixture is then allowed to cool partially, poured out, allowed to solidify, ground and treated with boiling water. A dark blue-green paste remains, which dyes cotton in fast shades of blue-green from a blue alkaline sodium hydrosulphite vat.

Example 2

500 parts of 3,4-dichloro-phthalic anhydride are melted and 100 parts of Bz2,Bz2'-dimethoxy-dibenzanthrone added as in Example 1. The temperature is raised to the boil, which is considerably higher than in Example 1, and the mixture boiled for 2 hours. The product is worked up as before. It dyes fast blue shades from a blue alkaline hydrosulphite vat.

Example 3

This is similar to the preceding examples except that the starting material is Bz2,Bz2'-dihydroxy-dibenzanthrone; 60 parts of this being heated with 320 parts of tetra-chloro-phthalic anhydride at about 320° C. for 12 hours. The product is a black paste, dyeing cotton in blue-grey shades of good fastness from a blue alkaline hydrosulphite vat.

Example 4

This is similar to Example 1, but 5 parts of copper are added to the melt and a green-blue product obtained.

Example 5

10 parts of the product from Example 3, in the form of a dry, finely divided powder, are gradually added, with good stirring to a mixture of 50 parts of molten phthalic anhydride. The temperature is then adjusted to 180° C., and a current of chlorine gas is passed through for several hours, until a sample portion contains about 35% of chlorine. The mixture is then allowed to cool partially, poured out, allowed to solidify, ground and thoroughly extracted with boiling water. The residue, on drying, gives a black powder, dyeing cotton in grey shades from a green-blue alkaline hydrosulphite vat.

Example 6

100 parts of tetrachloro phthalic anhydride are melted, and 30 parts of oxidized isodibenzanthrone gradually added, and stirred in, until a thorough mixture has been obtained. The temperature is then raised, as quickly as possible, to 350°, kept at 350° C. for a few minutes, and then the mixture cooled. After cooling partially, it is poured out, allowed to solidify, ground and extracted with hot, very dilute caustic soda solution, until all the chlorophthalic acid has been removed. The residue is then washed with water, until free from alkali, and dried. It is a black powder, dissolving in concentrated sulphuric acid with a bluish-green colour, and dyeing cotton in violet shades from a blue alkaline hydrosulphite vat.

The oxidized isodibenzanthrone is prepared as follows: 25 parts of isodibenzanthrone are dissolved in 625 parts of 96% sulphuric acid, containing 12.5 parts of boric acid. This solution is cooled to 5° C., and there is then added, over a period of 4 hours, 25 parts of manganese dioxide in 35 parts of 90% sulphuric acid, also at 5° C. When this has been added, the temperature is adjusted to 10° C., and maintained at this for 8 hours. The mixture is then diluted with 5000 parts of water. 53 parts of sodium bisulphite are added, the whole heated to boiling for half an hour, then filtered, washed and dried.

Example 7

30 parts of brominated Bz2,Bz2'-dimethoxy-dibenzanthrone are submitted to a heating treatment with 100 parts of tetrachloro phthalic anhydride under similar conditions to those described in Example 6. The product is also isolated in a similar manner, and then forms a black powder, dissolving in concentrated sulphuric acid with a violet colour, and dyeing cotton in blue shades from a blue alkaline hydrosulphite vat.

The brominated 12,12'-dimethoxy-dibenzanthrone is prepared as follows:

56 parts of bromine are mixed with 200 parts of 100% sulphuric acid, and 20 parts of Bz2,Bz2'-dimethoxy-dibenzanthrone are then stirred in; the temperature is raised to 30-35° C., and kept at this for 18 hours with rapid stirring after which the melt is drowned in cold water, and the dyestuff filtered off.

Example 8

35 parts of tetrachloro phthalic anhydride are melted and 10 parts of Bz2,Bz2'-diacetoxy-dibenzanthrone are then gradually stirred in. Stirring is continued until thorough mixing has been obtained, when the temperature is raised, as quickly as possible, to 350° C., maintained at this for 25 minutes, and the mixture then cooled. Isolation is carried out as in previous examples. On drying, the product is obtained as a black powder, dissolving in concentrated sulphuric acid, with a violet solution, and dyeing cotton in navy blue shades from an alkaline hydrosulphite vat.

It will be understood that many variations and modifications are possible in our preferred procedure, without departing from the spirit of this invention.

In the claims below it should be understood that where new products, dyestuffs, or articles of manufacture are claimed, we mean to include these bodies not only in substance, but also in whatever state they exist when applied to material dyed, printed, or pigmented therewith.

Having now particularly described and ascertained the nature of our invention, and in what manner the same is to be performed, we declare that what we claim is:

1. A process for producing novel compounds, useful as dyestuffs or intermediates for dyestuffs, which comprises heating an oxy-ketonic-perylene derivative selected from the group consisting of dihydroxy dibenzanthrone, dihydroxy isodibenzanthrone, derivatives obtained from these by substitution in the hydroxyl group, and halogen derivatives of either, above 270° C., with a phthalic anhydride compound selected from the group consisting of phthalic anhydride and its halogen derivatives.

2. A process as in claim 1, the heating being effected in the presence of a metallic catalyst.

3. A process as in claim 1, the heating being effected in the presence of a copper catalyst.

4. As a new article of manufacture, a dyestuff compound substantially identical with the product obtained by the process defined in claim 1.

5. A process for producing novel dyestuff compounds, which comprises heating an oxy-dibenzanthrone derivative selected from the group consisting of dihydroxy-dibenzanthrone, its ethers, its esters, and their respective halogen derivatives, above 270° C. with a phthalic anhydride compound selected from the group consisting of phthalic anhydride and its halogen derivatives.

6. As a new article of manufacture, a dyestuff compound substantially identical with the product obtained by the process defined in claim 5.

7. A process for producing novel dyestuff compounds, which comprises heating an oxy-dibenzanthrone derivative selected from the group consisting of dihydroxy-dibenzanthrone and its ethers, above 270° C. with a phthalic anhydride compound selected from the group consisting of phthalic anhydride and its chloro-derivatives.

8. As a new article of manufacture, a dyestuff compound substantially identical with the product obtained by the process defined in claim 7.

9. A process for producing novel dyestuff compounds, which comprises heating Bz2,Bz2'-dihydroxy-dibenzanthrone in tetrachloro-phthalic anhydride at a temperature above 350° C., until formation of the novel dyestuff is substantially complete.

10. As a new article of manufacture, a dyestuff compound substantially identical with the product obtained by the process defined in claim 9.

11. As a new article of manufacture a dyestuff compound substantially identical with the product obtained by heating an oxy-ketonic-perylene derivative selected from the group consisting of oxidized dibenzanthrone, oxidized isodibenzanthrone, derivatives obtained from these by substitution in the hydroxyl group, and halogen derivatives of either, above 270° C., with a phthalic anhydride compound selected from the group consisting of phthalic anhydride and its halogen derivatives, in the presence of a metallic catalyst.

12. As a new article of manufacture a dyestuff compound substantially identical with the product obtained by heating an oxy-ketonic-perylene derivative selected from the group consisting of oxidized dibenzanthrone, oxidized isodibenzanthrone, derivatives obtained from these by substitution in the hydroxyl group, and halogen derivatives of either, above 270° C., with a phthalic anhydride compound selected from the group consisting of phthalic anhydride and its halogen derivatives, in the presence of a copper catalyst.

CECIL SHAW.
ROBERT FRASER THOMSON.